United States Patent
Frodsham et al.

(10) Patent No.: US 7,328,359 B2
(45) Date of Patent: Feb. 5, 2008

(54) TECHNIQUE TO CREATE LINK DETERMINISM

(75) Inventors: Tim Frodsham, Portland, OR (US); Michael J. Tripp, Forest Grove, OR (US); David J. O'Brien, Portland, OR (US); Muraleedhara Navada, Santa Clara, CA (US); Naveen Cherukuri, San Jose, CA (US); Sanjay Dabral, Palo Alto, CA (US); David S. Dunning, Portland, OR (US); Theodore Z. Schoenborn, Portland, OR (US)

(73) Assignee: Intel Corporation, Santa Clara, CA (US)

( * ) Notice: Subject to any disclaimer, the term of this patent is extended or adjusted under 35 U.S.C. 154(b) by 568 days.

(21) Appl. No.: 10/897,225

(22) Filed: Jul. 21, 2004

(65) Prior Publication Data

US 2006/0020843 A1  Jan. 26, 2006

(51) Int. Cl.
*G06F 1/04* (2006.01)
*G06F 1/12* (2006.01)
*G06F 5/00* (2006.01)
*G06F 13/42* (2006.01)
*H04L 7/00* (2006.01)

(52) U.S. Cl. ...................... 713/400; 713/401; 713/500; 713/501; 713/502; 713/503

(58) Field of Classification Search ................ 713/401, 713/501–503, 400
See application file for complete search history.

(56) References Cited

U.S. PATENT DOCUMENTS 6,738,917 B2 * 5/2004 Hummel et al. ............ 713/400

* cited by examiner

*Primary Examiner*—James K. Treville
*Assistant Examiner*—Michael J Brown
(74) *Attorney, Agent, or Firm*—Trop, Pruner & Hu, P.C.

(57) ABSTRACT

A technique for promoting determinism among bus agents within a point-to-point (PtP) network. More particularly, embodiments of the invention relate to techniques to compensate for link latency, data skew, and clock shift within a PtP network of common system interface (CSI) bus agents.

29 Claims, 10 Drawing Sheets

TECHNIQUE TO CREATE LINK DETERMINISM

FIELD

Embodiments of the invention relate to electronic networks. More particularly, embodiments of the invention relate to clocking between two common system interface (CSI) link agents.

BACKGROUND

Typical prior art computer systems and networks rely on a common clock-based interface, in which the input/ouput (I/O) of each device is synchronized by the same clock signal or some derivative thereof. Furthermore, in some prior art systems, bus agents may reside on the same bus, and clocks may be routed to minimize clock skew between the various agents on the common bus.

For example, FIG. 1a illustrates a prior art shared bus computer system in which various bus agents receive a common clock from a system clock generator. These agents may exchange data using either a source synchronous or a common clock protocol. A source synchronous clocking protocol is one in which strobe signals are generated from the system clock and propagate with the data along the bus interconnecting the agents. The strobe signals are used to latch data into a source synchronous agent whenever data is transmitted between the agents. For agents using a common clock protocol, the system clock or some derivative thereof is delivered directly to each agent on the bus, and data is latched in the receiving agents on certain edges of the common clock.

In particular, FIG. 1b illustrates a agents within a common bus computer system, and corresponding timing diagram, in which a common clock protocol is used to exchange data between the agents of the common bus computer system. Referring to the timing diagram of FIG. 1b, although data seen at the output of the driving agent can be delayed somewhat at the far receiving agent, the data is available at the rising edge of the common clock and therefore is able to be latched within one cycle of the common clock, thereby maintaining determinism between the common clock and the data.

As more agents are added to the system of FIG. 1b, the data delay may be exacerbated, such that the data is not available at the rising clock edge of the common clock, and therefore it may require multiple common clock cycles to latch the data at the far receiving agents in order to maintain determinism between the common clock and the data. Because data delay is proportional to the number of agents in the common bus system of FIG. 1b, the number of agents that can be supported by a common clock protocol is limited by the number of system clock cycles of delay that may be tolerated within a computer system. Accordingly, it may not be practical to add bus agents to the system illustrated in FIG. 1b.

FIG. 1c illustrates a common bus computer system in which data is exchanged between the agents using a source-synchronous clocking protocol. Unlike the common clocking protocol of FIG. 1b, the data originating from the driving agent is latched at the receiving agents by strobe signals derived from the system clock. The strobe signals propagate along with the data from agent to agent, and are therefore only generated when data is transmitted. Use of the strobe signals allows multiple data to be transmitted within the same system bus cycle, as one data can be latched on an edge, such as the falling edge, of one strobe and the next data can be latched on an edge, such as a the falling edge, of the second strobe. This latching scheme may be repeated until each data is latched by the receiving agents.

As the timing diagram of FIG. 1c indicates, the first data is latched by the far receiving agent within one system bus cycle, and determinism between the strobes and the data is maintained. As more agents are added to the system of 1c, however, it may require multiple system clock cycles to latch the data at far receiving agents to maintain determinism between the data and the strobe signals. Therefore, the number of bus agents that can be used in the common bus system of FIG. 1c, may be limited by the number of system clock cycles of delay that may be tolerated within a computer system. Accordingly, it may not be practical to add bus agents to the system illustrated in FIG. 1c.

BRIEF DESCRIPTION OF THE DRAWINGS

Embodiments of the invention are illustrated by way of example and not limitation in the figures of the accompanying drawings, in which like references indicate similar elements and in which.

DETAILED DESCRIPTION

Embodiments of the invention relate to electronic networks. More particularly, embodiments of the invention relate to determinism among a number of electronic elements within a point-to-point (PtP) computer network.

In order to maintain deterministic communication between two or more bus agents within a PtP network, embodiments of the invention employ various techniques to manage latency and maintain a known set of states between the devices. Although embodiments of the invention mention PtP computer systems, in which a common system interface (CSI) protocol is used, embodiments of the invention are not so limited. Indeed, embodiments of the invention disclosed herein may be used in any electronics networks in which a bus and input/output (I/O) clock is used to transfer information between devices in the network.

Figure 1A:
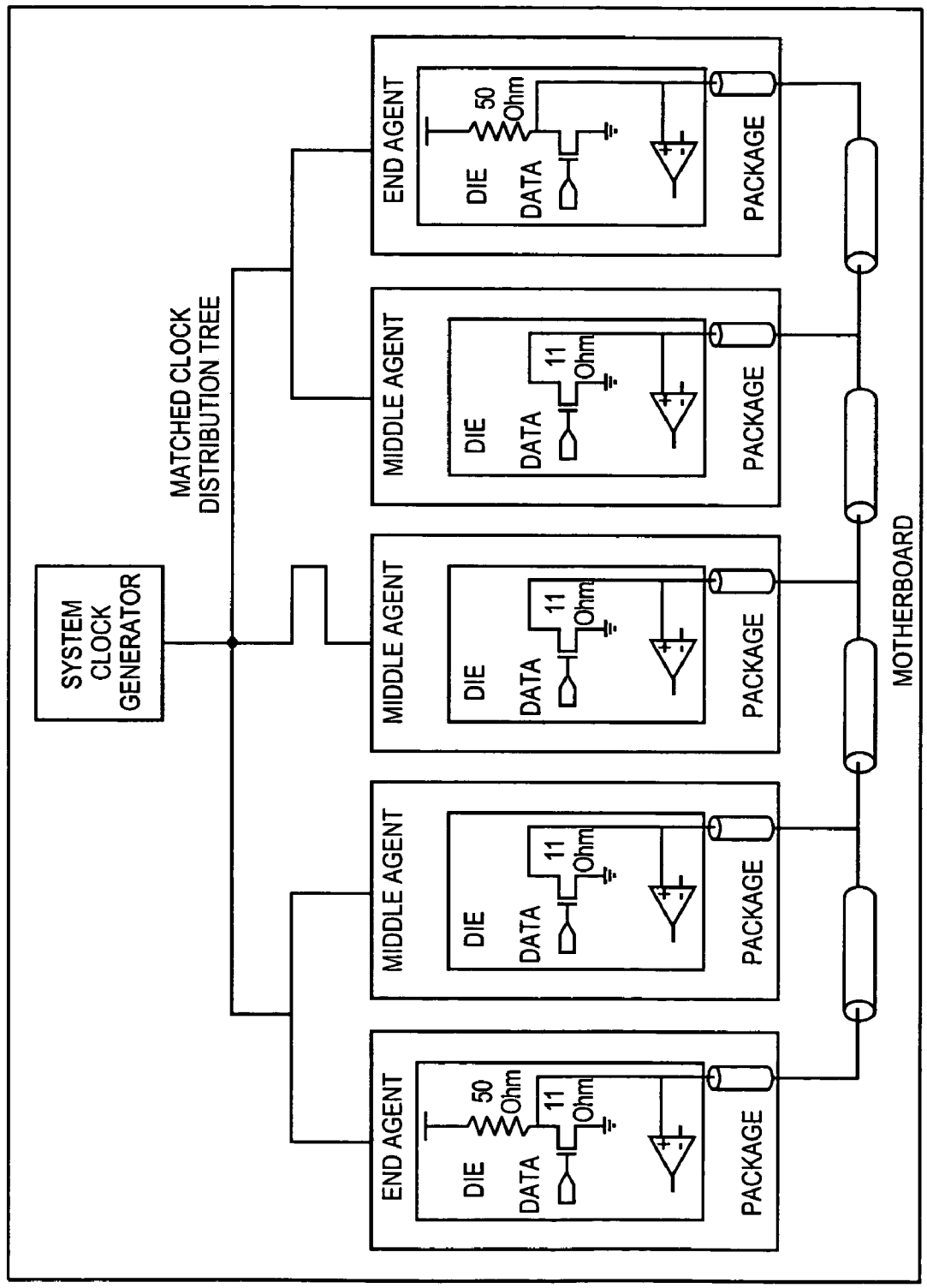
FIGS. 1a-1c illustrate a prior art common bus system in which a common clock and synchronous clock protocol may be used.
Figure 1B:
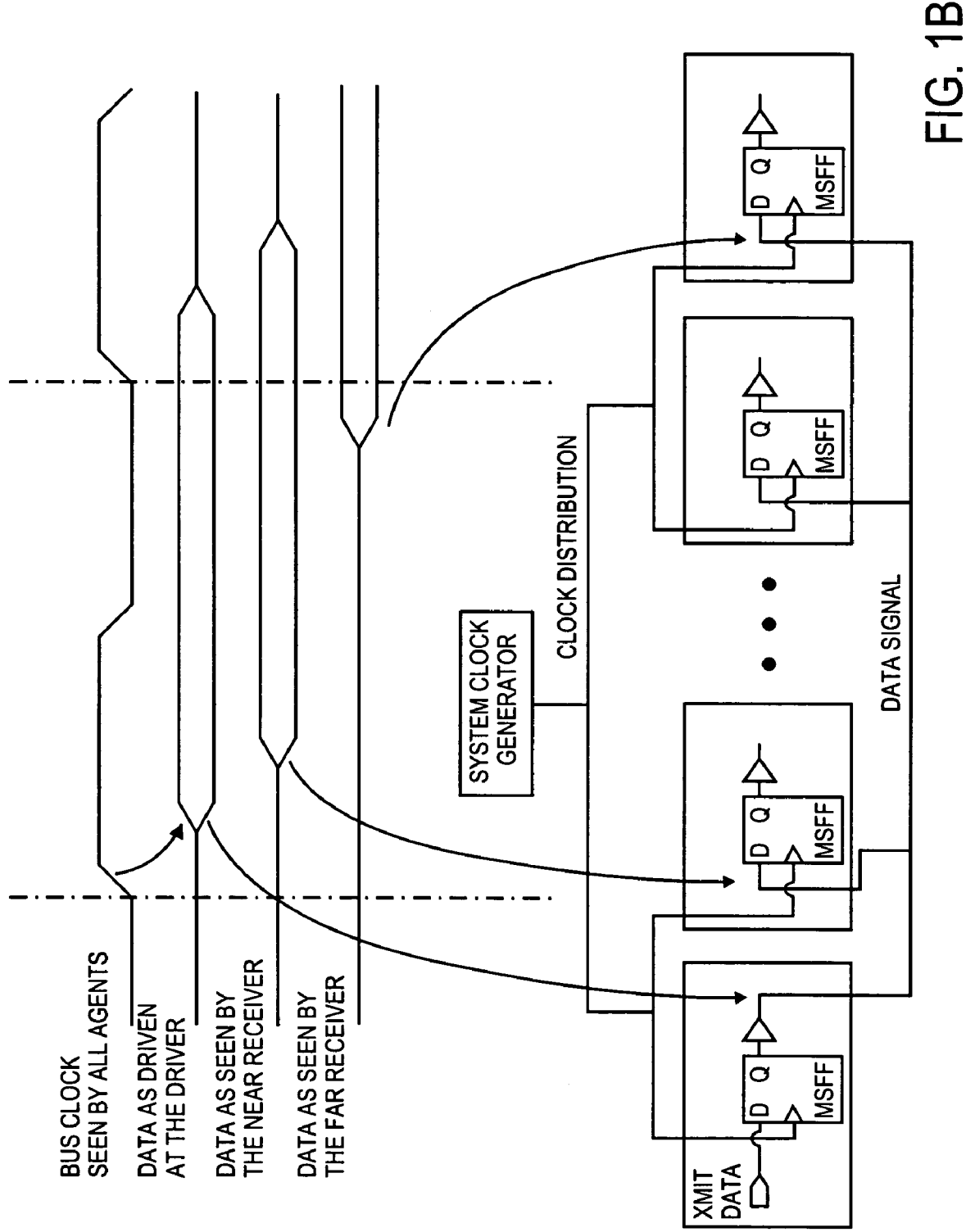
Figure 1C:
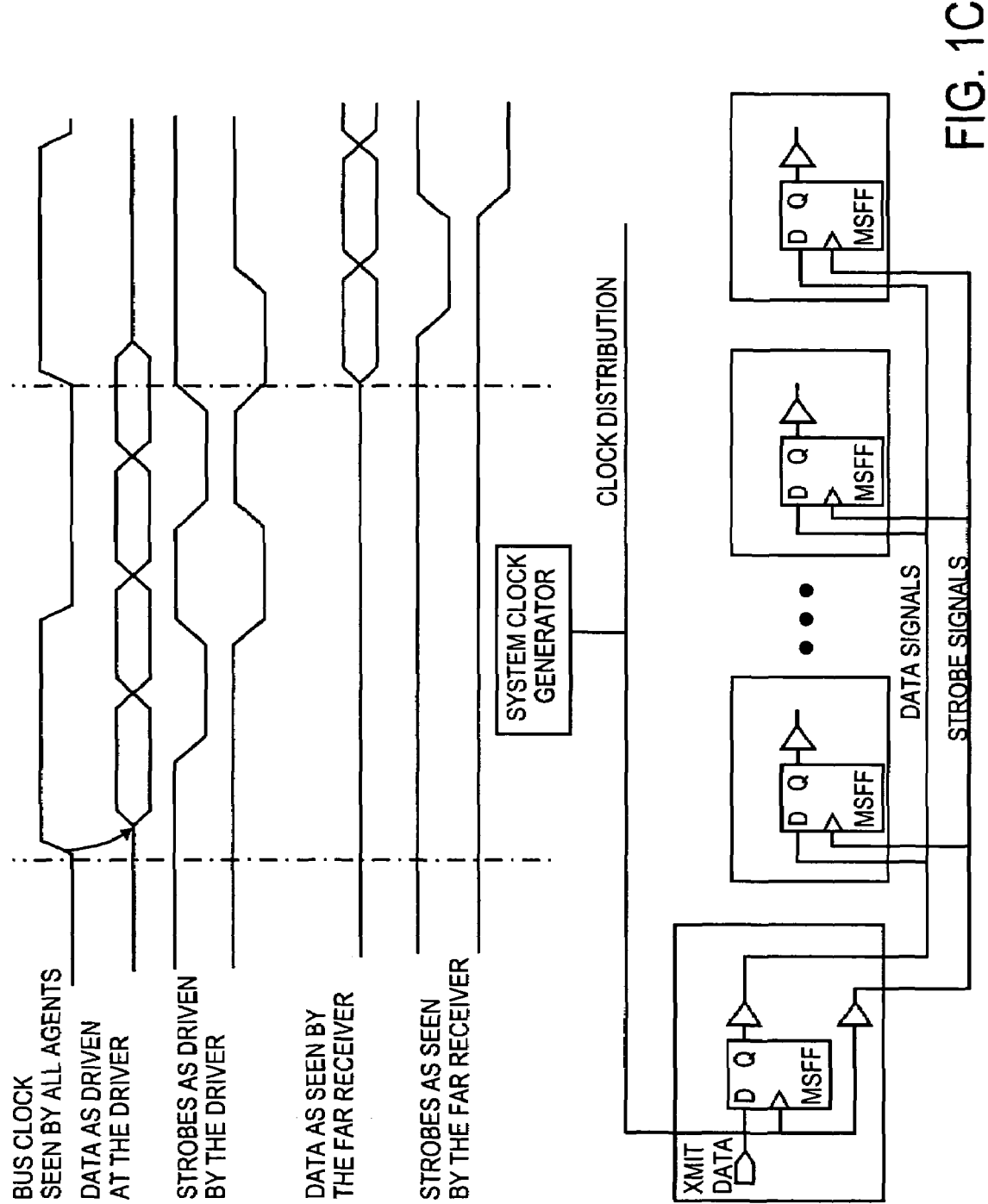
Figure 2:
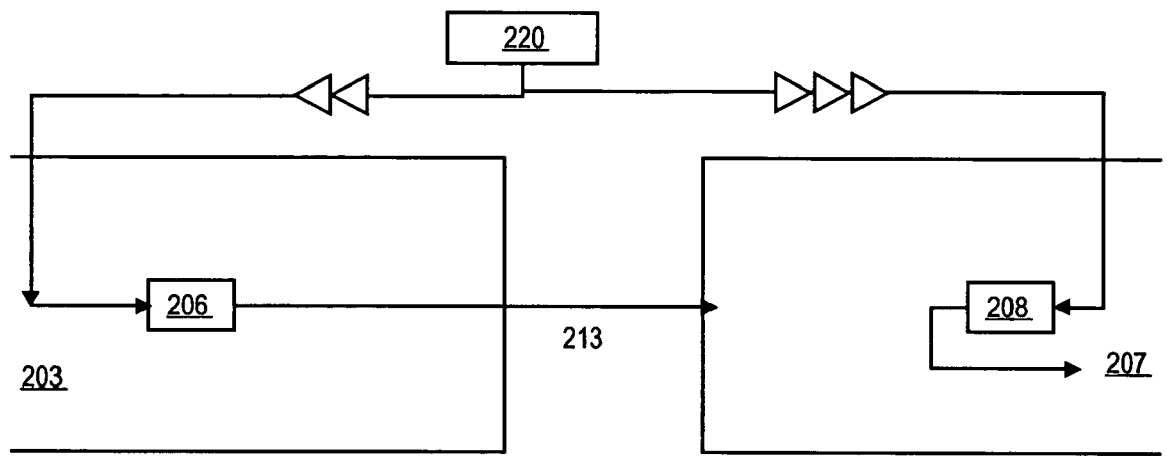
FIG. 2 illustrates two bus agents and corresponding clocks within a point-to-point (PtP) computer system in which at least one embodiment of the invention may be used.

FIG. 2 illustrates two bus agents and the corresponding clocking structure within a PtP computer system in which at least one embodiment of the invention may be used. Particularly, FIG. 2 illustrates a transmitting agent 203 and a receiving agent 207 connected by a bus 213 through which information may be exchanged between the agents. In one embodiment, the agents are CSI agents and the link is a CSI link. Furthermore, the transmitter and receiving agents may each be able to transmit and receive information across the link.

The agents are supplied with a common clock from a system clock generator 220, which is fed into a phase lock loop (PLL) 206 208 within each of the agents in order to provide an appropriate clock phase to compensate for system variances due to temperature, process, voltage variations, etc. Furthermore, the PLL of FIG. 2 can be used to divide the system clock in order to provide other clock sources needed within the bus agent or system. Moreover, the PLL of FIG. 2 may be replaced with other types of clock synthesizer circuits in other embodiments.

From the PLL, an I/O clock 213 can be generated. In the embodiment illustrated in FIG. 2, the I/O clock is forwarded in the link between the bus agents when transferring data between the agents. In other embodiments, the I/O clock may not be forwarded but may be generated within a receiving agent.

The system clock of FIG. 2 is slower than the I/O clock, in at least one embodiment. In one embodiment in particular, the system clock operates within approximately 200 Mhz to 400 Mhz, whereas the I/O clock operates up to approximately 5 Ghz. The high-speed I/O clock derived from a common system clock allows, at least conceptually, all agents in the system communicate data at a high rate while maintaining at least some level of determinism. Although the high-speed I/O clock is derived from the common system clock, however, delay between the I/O clock and data within individual bus agents may still arise.

Delay between data and an I/O clock may arise, because, inherent in delivering the system clock to each agent within the system and deriving the I/O clocks therefrom, is a certain amount of delay from agent to agent. Furthermore, latency may exist in the link between the transmitting and the receiving agents that can cause data transmitted across the bus to arrive at the receiving agent outside the timeframe in which the receiving agent is expecting the data.

Figure 3:
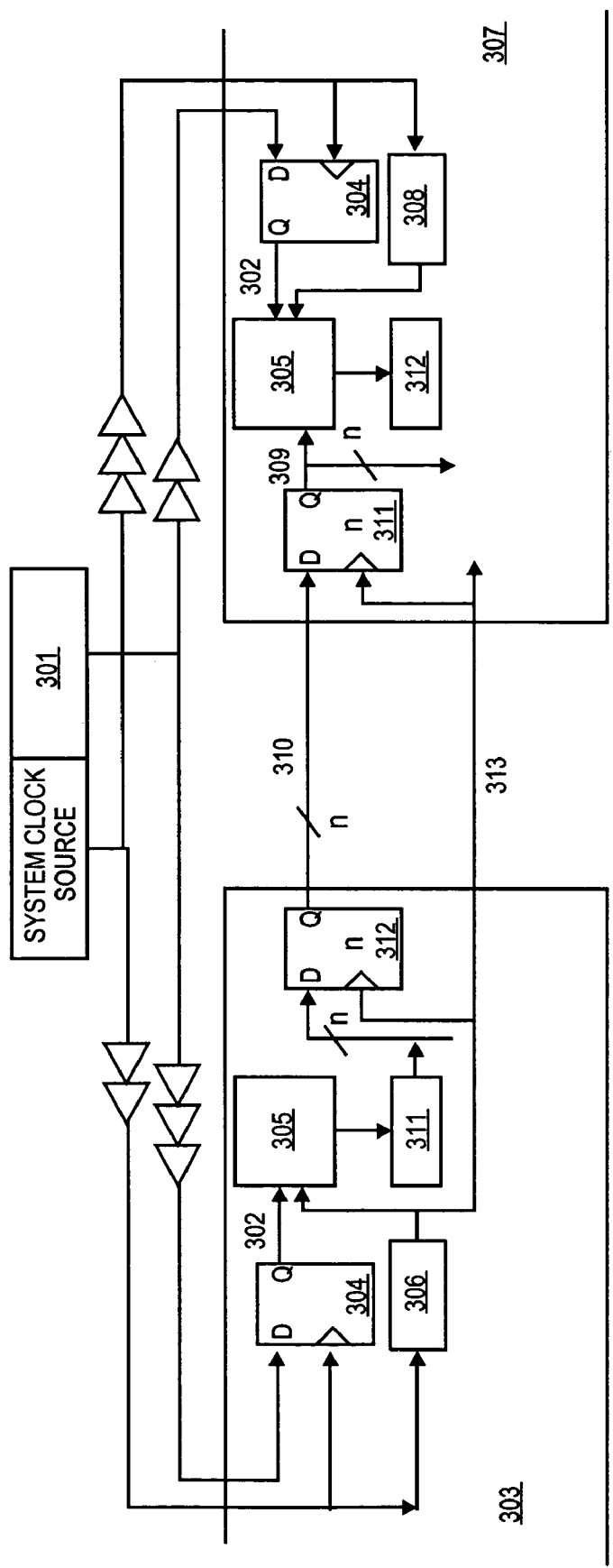
FIG. 3 illustrates a technique to determine the latency between the I/O clock domain of the transmitting agent and the I/O clock domain in the receiving agent, according to one embodiment of the invention.

FIG. 3 illustrates a portion of one embodiment of the invention, in which the latency in the link between a transmitting agent and a receiving agent is quantified. Specifically, FIG. 3 illustrates a technique to measure the delay that may occur in the link between the receiving and transmitting agents due to the physical length and other characteristics of the link. Upon latching a synchronizing event, such as a reset 301 in transmitting agent's and receiving agent's latches 304, transmitting agent's and receiving agent's counters 305 in the transmitting agent 303 and receiving agent 307 are enabled. In other embodiments, other signals may be used as a synchronizing event instead of the reset signal. Furthermore, the synchronizing counters can be used to help promote determinism in other processes and signals within the system in addition to the I/O clock domains of the agents within the system.

The synchronization counters of the transmitting agent and the receiving agent are enabled after the reset event by signal 302. A command and status register (CSR) 311 captures the count from the transmitting agent's PLL 306 at which the data 310 is transmitted to the receiving agent. The count is encoded in a packet header of the data transmitted from the transmitting agent to the receiving agent. In one embodiment, the data is organized in an n-bit wide group and is transmitted across n number of lanes, where "n" is 20. However, in other embodiments, "n" may be another number of lanes.

The corresponding CSR 312 at the receiving agent captures the receiving agent's counter value after the data is received by the receiving agent, as latched by latch 311 controlled by I/O clock 313 indicated by signal 309. The counter in the receiving agent counts the number of receiver clock cycles from the receivers PLL 308 upon receiving the synchronizing event. The count encoded in the transmitted data is decoded when the packet header is received by the receiving agent. The difference between the transmitted count and the receiving agent's PLL count can be used to quantify and adjust the latency in the link between the transmitting and receiving agent, in one embodiment of the invention.

For example, in one embodiment, the latency information is used to compensate for the link latency by buffering the received data so that an appropriate number of I/O clock cycles may pass before the receiving agent uses the data. Particularly, the latency information calculated from FIG. 3 can be used to set a pointer to a desired buffer depth to "absorb" the differences between the transmitting agent's I/O clock domain and the receiving agent's.

Furthermore, the latency may be calculated regularly during the operation of the system of FIG. 3, instead of once during a period of continuous operation of the system. Calculating the latency at multiple times during the operation of the system of FIG. 3 can allow more efficient use of the corresponding latency buffer, as a number of entries allocated in the buffer to store the data can be more regularly updated. In this manner, the buffer doesn't contain unnecessarily allocated buffer entries, or at least as many as when latency is calculated only once during the operation of the system.

Inherent in any synchronous electronics system is certain amount of delay, or "skew", between data in flight across a bus between two agents and the bus clock to which the data synchronizes. This may be due to slight variations in the length of the data traces in relation to the bus clock trace. In a PtP computer system, this slight clock/data skew can result in the data arriving at the receiving agent one or more cycles out of phase with the bus clock. Accordingly, one aspect of an embodiment of the invention attempts to substantially correct for this skew by latching the data at the receiving agent with a slightly time-shifted version of the bus clock.

Figure 4:
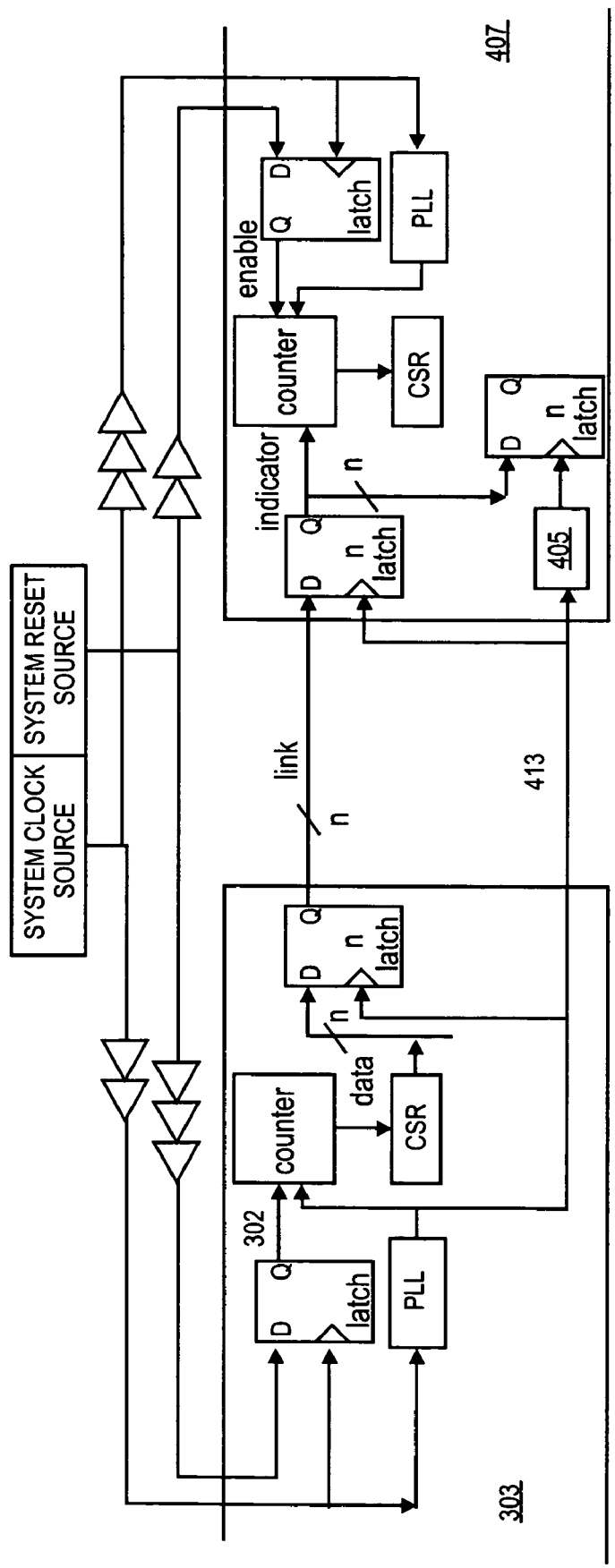
FIG. 4 illustrates one embodiment of the invention, in which the latency information between the input/output (I/O) clock of a transmitting agent and that of a receiving agent is used to interface the I/O clock domain of the transmitting agent to that of the receiving agent.

In particular, FIG. 4 illustrates one aspect of one embodiment of the invention in which the bus clock 413 is received at the receiving agent 407 by a phase interpolator 405 that generates a phase-shifted version of the bus clock in order to ensure the clock transition is appropriately matched with the data transmitted by the transmitting agent 303 to latch, at latch 408, the received data. The data received may be organized as an n-bit group delivered by n number of lanes, where "n" is 20 in one embodiment. In other embodiments, "n" may be greater or less than 20.

The interpolated clock is responsible for latching the data, in the aspect of one embodiment illustrated in FIG. 4. After the data is latched in the receiving agent, the data must be translated between the transmitting agent's I/O clock domain and the receiving agent's I/O clock domain. Translating between domains can be done in various ways using various embodiments of the invention. Generally, however, in order for the data to be translated to the receiving agent's I/O clock domain, the skew between the data, caused by variations between the data lane lengths, for example, must be removed. Furthermore, fluctuations in the transmitted I/O clock phase in relation to the receiver's I/O clock phase must be compensated for. Fluctuations in between the transmitting agent's I/O clock and that of the receiving agent can be caused by variations system voltage, device process, and temperature, among others, which cause the PLL or other clock circuitry within the agents to react differently in relation to each other. Finally, the latency across the link, calculated using one aspect of the embodiment in FIG. 3, must be compensated for at the receiving agent.

Figure 5:
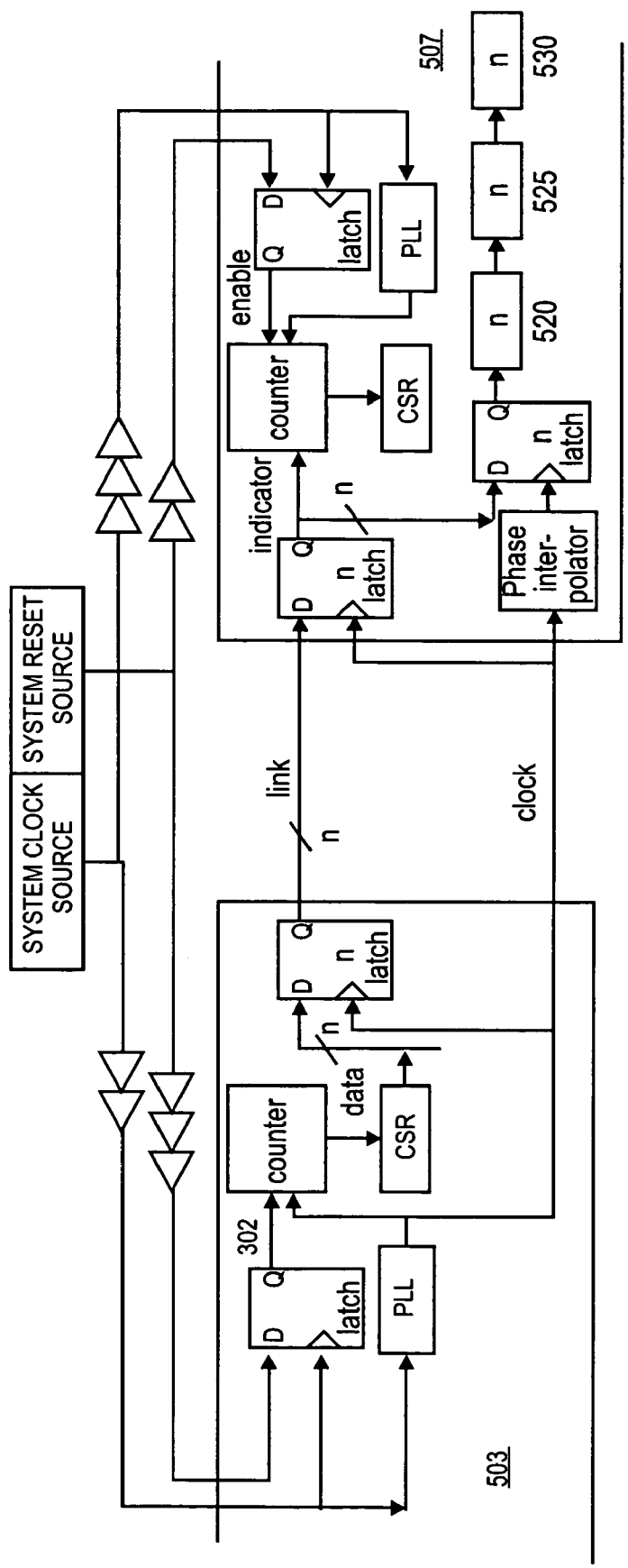
FIG. 5 illustrates a drift buffer according to one embodiment.

FIG. 5 illustrates aspects of one embodiment of the invention to account for the above clock and data variations. Particularly, FIG. 5 illustrates a buffer architecture for removing skew between the data received by the receiving agent, compensating for variations between the I/O clocks of the transmitting and receiving agents, and compensating for latency across the link from the transmitting agent 503 to the receiving agent 507.

Referring to FIG. 5, the data captured in the n latches 508, is sent first to an array of n skew buffers 520, where "n" is 20 in one embodiment, but maybe more or less than 20 in other embodiments. Each skew buffer takes in data from one of the n lanes and uses a buffer to indicate the beginning of each data in each lane. The pointer can be used to indicate to an agent reading from the skew buffer where to look for the beginning of the data for each lane, and thereby removing the skew between the data corresponding to each lane.

After data is stored in the skew buffer, in FIG. 5, the data is transferred to n number of drift buffers 525. The n drift buffers buffer the de-skewed data to account for shift that occur in forwarded transmitting agent's I/O clock throughout operation of one embodiment. Essentially, the drift buffers act to absorb the shift that occurs between the transmitting and receiving agents clock domains, and a pointer is used to keep track of the beginning of the data in each of the skew buffers. Alternatively, the skew buffer may be one buffer containing n storage elements per buffer entry to store the data from the n skew buffers. In this alternative embodiment, a single pointer may be used to keep track of the beginning of the n-bit wide data in the drift buffer.

Finally, the n-bit data is transferred from the drift buffer or buffers to the latency buffer 530. The latency buffer may be composed of n number of latency buffers corresponding to the n number of lanes of data. In either case, the latency buffer serves to account for the latency determined by the aspect of the embodiment illustrated in FIG. 3. In particular, the latency buffer can be used to store the data for a certain number of cycles of the receiving agent's I/O clock before the data is read out of the latency buffer. The certain number of cycles of the receiving agent's I/O clock may correspond to the maximum expected latency of the link or some other deterministic number of cycles, such that the receiving agent's I/O clock is latching the data in a deterministic way.

Although the embodiment of FIG. 5 illustrates the skew buffers, drift buffer(s), and latency buffer(s) as three different buffer structures, in other embodiments, the buffers may be combined in to one buffer. Furthermore, in other embodiments any two of the buffers may be combined into one buffer.

Figure 6:
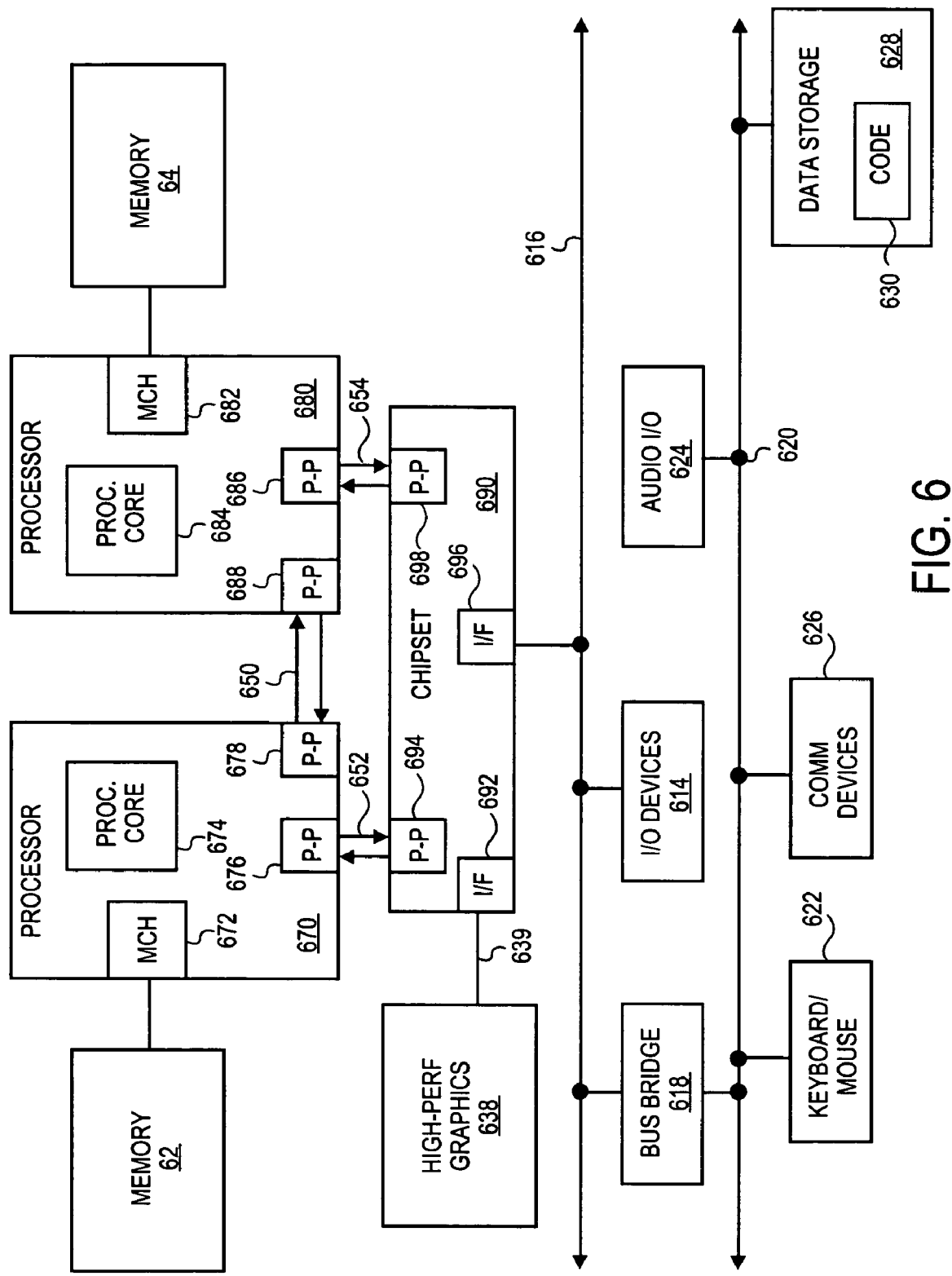
FIG. 6 illustrates a point-to-point (PtP) computer system in which at least one embodiment of the invention may be used.

FIG. 6 illustrates a computer system that is arranged in a point-to-point (PtP) configuration. In particular, FIG. 6 shows a system where processors, memory, and input/output devices are interconnected by a number of point-to-point interfaces.

The system of FIG. 6 may also include several processors, of which only two, processors 670, 680 are shown for clarity. Processors 670, 680 having cores 674, 684 may each include a local memory controller hub (MCH) 672, 682 to connect with memory.Processors 670, 680 may exchange data via a point-to-point (PtP) interface 650 using PtP interface circuits 678, 688. Processors 670, 680 may each exchange data with a chipset 690 via individual PtP interfaces 652, 654 using point to point interface circuits 676, 694, 686, 698. Chipset 690 may also exchange data with a high-performance graphics circuit 638 via a high-performance graphics interface 639 via a PTP interface 692, and with a bus 616 via a PtP interface 696. As shown, bus 616 is coupled to a bus bridge 618 and I/O device 614, In turn, bus bridge 618 couples to a second bus 620. to which are coupled a keyboard/mouse 622, communication device 626, audio I/O 624, and a data storage 628, including code 630.

At least one embodiment of the invention may be located within any of the PtP bus agents of FIG. 6. Furthermore, other embodiments of the invention may be distributed throughout several circuits, logic units, or devices illustrated in FIG. 6.

Figure 7:
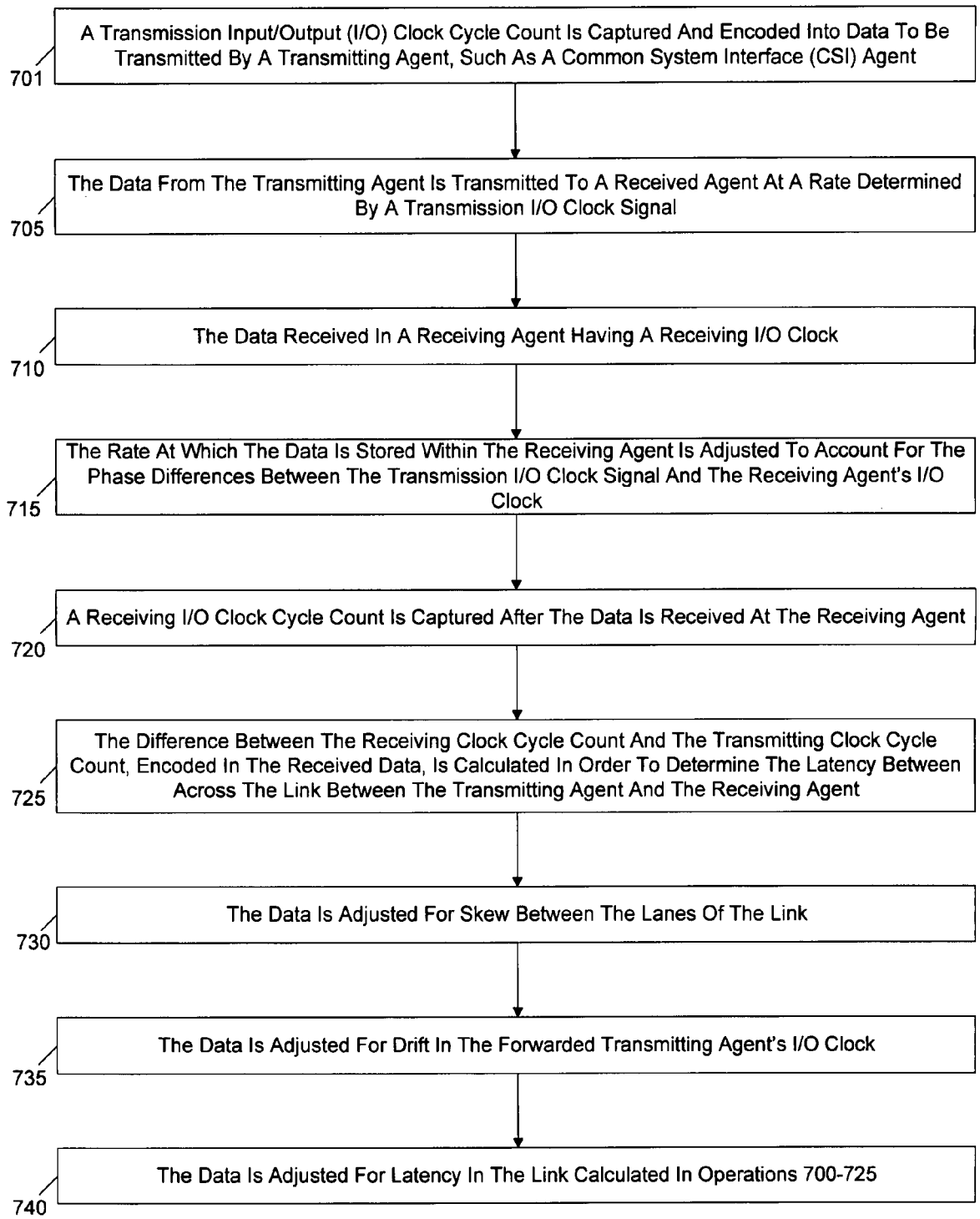
FIG. 7 illustrates operations for carrying out at least one embodiment of the invention.

FIG. 7 is a flow diagram illustrating a technique for carrying out certain aspects one embodiment of the invention. At operation 700, a synchronizing event, such as a system reset is generated that starts counters at the receiving agent and the transmitting agent. At operation 701, a transmission input/output (I/O) clock cycle count is captured and encoded into the data to be transmitted by a transmitting agent, such as a common system interface (CSI) agent. At operation 705, the data from the transmitting agent is transmitted to a receiving agent at a rate determined by a transmission I/O clock signal. At operation 710, the data is received in a receiving agent having a receiving I/O clock. At operation 715, the phase at which the data is stored within the receiving agent is adjusted to account for the phase differences between the transmission I/O clock signal and the receiving agent's I/O clock.

At operation 720, a receiving I/O clock cycle count is captured after the data is received at the receiving agent. At operation 725, the difference between the receiving clock cycle count and the transmitting clock cycle count, encoded in the received data, is calculated in order to determine the latency between across the link between the transmitting agent and the receiving agent.

At operation, 730, the data is adjusted for skew between the lanes of the link. At operation 735, the data is adjusted for drift that occurs in the forwarded transmitting agent's I/O clock. Finally, at operation 740, the data is adjusted for the latency of the link calculated in operations 700-725.

Figure 8:
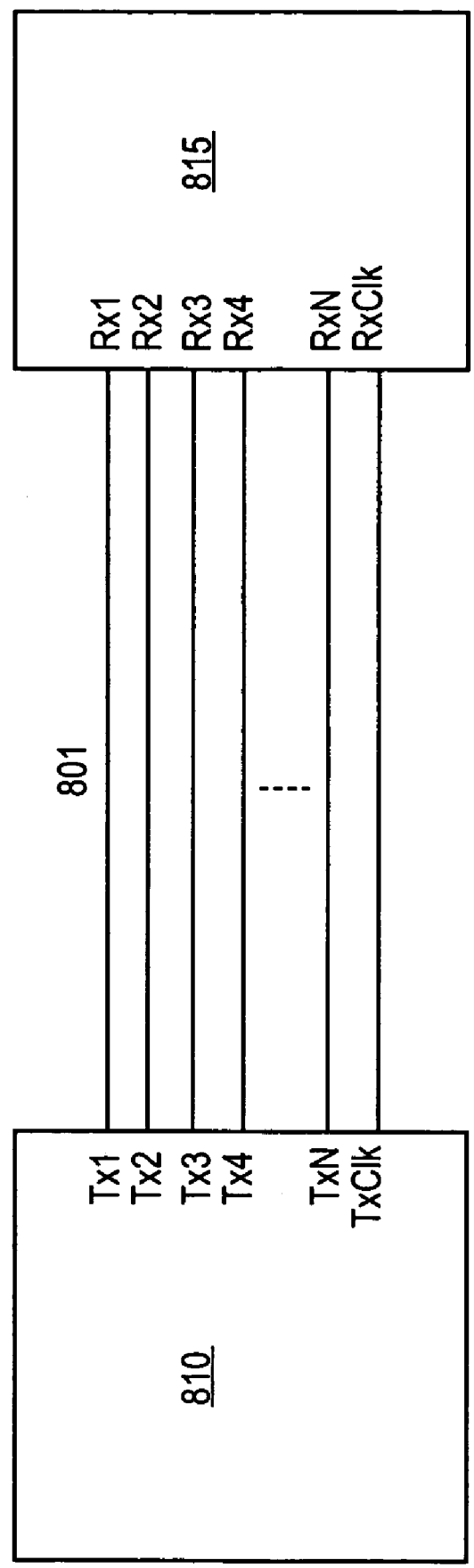
FIG. 8 illustrates two devices within a point-to-point (PtP) network in communication via a common system interface (CSI) protocol, in which one embodiment of the invention may be used.

FIG. 8 illustrates two bus agents, 810 and 815, connected by a PtP link in which embodiments of the invention may be used. In the example illustrated in FIG. 8, the link 801 is composed of "n" number of lanes and a clock signal. In at least one embodiment, n is equal to 20, but in other embodiments, n may represent one or more lanes. Furthermore, in some embodiments, the clock signal may not be present. The agents illustrated in FIG. 8 may be processors or other agents, such as an I/O controller hub, or some combination thereof.

Embodiments of the invention described herein may be implemented with circuits using complementary metal-oxide-semiconductor devices, or "hardware", or using a set of instructions stored in a medium that when executed by a machine, such as a processor, perform operations associated with embodiments of the invention, or "software". Alternatively, embodiments of the invention may be implemented using a combination of hardware and software.

While the invention has been described with reference to illustrative embodiments, this description is not intended to be construed in a limiting sense. Various modifications of the illustrative embodiments, as well as other embodiments, which are apparent to persons skilled in the art to which the invention pertains are deemed to lie within the spirit and scope of the invention.

What is claimed is:

1. An apparatus comprising:
   first logic to calculate the latency of a link between a transmitting agent and a receiving agent based on a first count and a second count, the first count embedded in a data racket received from the transmitting agent, the first count corresponding to a count of a phase lock loop (PLL) of the transmitting agent at which the data packet is transmitted, the second count corresponding to a count of a PLL of the receiving agent after the data packet is received;
   second logic to control a phase at which data received by the receiving agent is latched in the receiving agent;
   clock domain crossing logic to compensate for data skew, drift in the transmitting agent's input/output (I/O) clock, and the latency.

2. The apparatus of claim 1 wherein the clock domain crossing logic includes a phase interpolator to generate an interpolated clock signal having an interpolated phase between the transmitting agent's I/O clock phase and the receiving agent's I/O clock phase.

3. The apparatus of claim 2 wherein the clock domain crossing logic includes a domain crossing latch to latch data received by the receiving agent at a phase controlled by the interpolated clock signal.

4. The apparatus of claim 3 wherein the clock domain crossing logic includes a skew buffer to remove skew among the data received by the receiving agent.

5. The apparatus of claim 4 further comprising a drift buffer coupled to the skew buffer to compensate for drift in the transmitting agent's I/O clock.

6. The apparatus of claim 1 wherein the transmitting agent is to encode the first count in a header of the data packet.

7. The apparatus of claim 6 wherein the first logic includes receiving logic to capture the second count after the data packet is received by the receiving agent.

8. The apparatus of claim 7 wherein the latency depends upon the difference between the second and first counts.

9. The apparatus of claim 1 wherein the transmitting agent's I/O clock and the receiver agent's I/O clock are synchronously generated from a common clock.

10. The apparatus of claim 1 wherein the first logic is to calculate the link latency regularly during system operation.

11. The apparatus of claim 10 further comprising a latency buffer coupled to a drift buffer to compensate for the latency of the link.

12. The apparatus of claim 11 wherein a number of entries in the latency buffer are dynamically updated during the system operation, based on the regular calculation of the link latency.

13. A system comprising:
    a system clock from which a transmitting bus agent input/output (I/O) clock and a receiving bus agent I/O clock is to be commonly derived;
    a transmitting bus agent to transmit data at a rate controlled by the transmitting I/O clock;
    a receiving bus agent to receive data at a rate controlled by the receiving I/O clock;
    determinism logic to synchronize the transmitting agent I/O clock domain with the receiving agent I/O clock domain based on a first synchronization count embedded with data transmitted by the transmitting bus agent and a second synchronization count obtained after receipt of the data in the receiving bus agent.

14. The system of claim 13 wherein the transmitting bus agent and the receiving bus agent each include a phase lock loop (PLL) to help synchronize the phase of the system clock within the transmitting bus agent and the receiving bus agent.

15. The system of claim 14 wherein the transmitting I/O clock and the receiving I/O clock is to be derived from the PLL within the transmitting bus agent and the receiving bus agent, respectively.

16. The system of claim 13 wherein the determinism logic includes clock domain crossing logic to compensate for data skew, drift in the transmitting I/O clock, and latency in a link between the transmitting and receiving bus agents across which data is to be exchanged.

17. The system of claim 16 wherein the determinism logic includes memory to store the first synchronization count at which the data is transmitted from the transmitting bus agent.

18. The system of claim 17 wherein the determinism logic includes memory to store the second synchronization count at which the data is received by the receiving bus agent.

19. The system of claim 18 wherein the determinism logic includes latency logic to determine link latency by calculating the difference between the receiving agent I/O clock cycle count and the transmitting agent I/O clock cycle count.

20. The system of claim 19 wherein the latency logic is to control a phase at which data is read from a first-in-first-out (FIFO) buffer in the receiving bus agent.

21. A method comprising:
    encoding a transmitting input/output (I/O) clock cycle count, corresponding to a count of a first synchronization counter at which a first data is to be transmitted by a transmitting system agent, in the first data;
    transmitting the first data from the transmitting agent to a receiving agent at a rate controlled by a transmission I/O clock signal, the transmission I/O clock signal, the transmission I/O clock signal derived from a common clock signal;
    receiving the first data in a receiving agent having a receiving I/O clock signal, the receiving I/O clock signal derived from the common clock signal;
    adjusting the phase at which the first data is stored within the receiving agent to account for the phase differences between the transmission I/O clock signal and the receiving I/O clock signal.

22. The method of claim 21 further comprising capturing a receiving I/O clock cycle count after the first data is received by the receiving agent, corresponding to a count of a second synchronization counter after the first data received by the receiving agent.

23. The method of claim 22 further comprising calculating the difference between the receiving I/O clock cycle count and the transmitting I/O clock cycle count in order to determine the latency of a link between the transmitting agent and the receiving agent.

24. The method of claim 23 wherein the adjusting includes interpolating between the phase of the transmitting I/O clock signal and the receiving I/O clock signal.

25. The method of claim 24 wherein the adjusting includes using the latency to control the rate at which the first data is stored in a latency buffer.

26. The method of claim 24 wherein the adjusting includes using a skew buffer to remove skew between lanes of the first data.

27. The method of claim 26 wherein a drift buffer is used to account for drift in the transmission I/O clock signal.

28. The method of claim 23 wherein the transmitting I/O clock cycle count and the receiving I/O clock cycle count are started with a synchronizing event.

29. The method of claim 28 wherein the synchronizing event is a system reset.

* * * * *